(12) United States Patent
Chi et al.

(10) Patent No.: US 9,983,707 B2
(45) Date of Patent: May 29, 2018

(54) TOUCH PANEL AND MANUFACTURE METHOD THEREOF

(71) Applicant: TPK Touch Solutions (Xiamen) Inc., Xiamen (CN)

(72) Inventors: Ho-Hsun Chi, Hsinchu (TW); Fengming Lin, Fuzhou (CN); Xianbin Xu, Xiamen (CN); Yuh-Wen Lee, Hsinchu (TW); Jinpiao Chen, Quanzhou (CN); Zhiqian Ye, Zhangzhou (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 92 days.

(21) Appl. No.: 15/060,629

(22) Filed: Mar. 4, 2016

(65) Prior Publication Data
US 2016/0259440 A1    Sep. 8, 2016

(30) Foreign Application Priority Data
Mar. 5, 2015    (CN) .......................... 2015 1 0096756

(51) Int. Cl.
*G06F 3/041*    (2006.01)
(52) U.S. Cl.
CPC .... *G06F 3/041* (2013.01); *G06F 2203/04103* (2013.01)
(58) Field of Classification Search
CPC ...... G06F 3/0416; G06F 3/0412; G06F 3/044; G06F 3/041; G06F 2203/04103; G06F 3/04883; G06F 3/0488; G06F 3/0414; G06F 3/016; G06F 3/0418; G06F 2203/04102; G06F 2203/04105; G06F 2203/04101

USPC .......................................................... 345/173
See application file for complete search history.

(56) References Cited

U.S. PATENT DOCUMENTS

| | | | | |
|---|---|---|---|---|
| 2005/0275342 | A1* | 12/2005 | Yanagawa | H01L 27/322 313/504 |
| 2010/0134439 | A1* | 6/2010 | Ito | G06F 3/044 345/174 |
| 2011/0012841 | A1* | 1/2011 | Lin | G06F 3/041 345/173 |
| 2011/0069033 | A1* | 3/2011 | Meng | G06F 3/044 345/174 |
| 2013/0082961 | A1* | 4/2013 | Wang | G06F 3/044 345/173 |

(Continued)

*Primary Examiner* — Grant Sitta
(74) *Attorney, Agent, or Firm* — Cooper Legal Group, LLC

(57) ABSTRACT

A touch panel includes a cover plate, a light transmissive separating layer, an opaque layer and a touch sensing layer. The cover plate has an inner surface and a plate lateral surface adjoined to each other. The inner surface has a first portion and a second portion adjoined to each other. The light transmissive separating layer covers the first portion and has a peripheral zone and a central zone. The peripheral zone surrounds the central zone. The light transmissive separating layer has a light transmissive lateral surface distal to the central zone. The opaque layer covers the peripheral zone and has an opaque outer lateral surface substantially aligned with the light transmissive lateral surface. The touch sensing layer is located on the central zone, and the light transmissive separating layer separates the cover plate and the touch sensing layer.

20 Claims, 5 Drawing Sheets

(56) References Cited

U.S. PATENT DOCUMENTS

| | | | |
|---|---|---|---|
| 2013/0100039 A1* | 4/2013 | Hong | B32B 37/1207 345/173 |
| 2013/0154949 A1* | 6/2013 | Jamshidi Roudbari | G02F 1/1339 345/173 |
| 2013/0241862 A1* | 9/2013 | Kim | C09J 7/0246 345/173 |
| 2013/0342927 A1* | 12/2013 | Hino | G02B 5/201 359/891 |
| 2014/0015772 A1* | 1/2014 | Tung | G06F 3/041 345/173 |
| 2014/0036167 A1* | 2/2014 | Chi | G06F 1/1692 349/12 |
| 2014/0125610 A1* | 5/2014 | Oh | G06F 1/1637 345/173 |
| 2014/0204054 A1* | 7/2014 | Kim | G06F 3/0412 345/174 |
| 2015/0130763 A1* | 5/2015 | Park | G06F 3/041 345/174 |
| 2015/0205422 A1* | 7/2015 | Choi | G06F 3/041 345/173 |
| 2016/0092011 A1* | 3/2016 | Kong | H05K 1/097 345/174 |
| 2016/0370646 A1* | 12/2016 | Nishiyama | G03F 7/11 |
| 2017/0061193 A1* | 3/2017 | Young | G06K 9/00013 |
| 2017/0125467 A1* | 5/2017 | Lin | H01L 27/14623 |
| 2017/0357347 A1* | 12/2017 | Swartz | G06F 3/044 |

\* cited by examiner

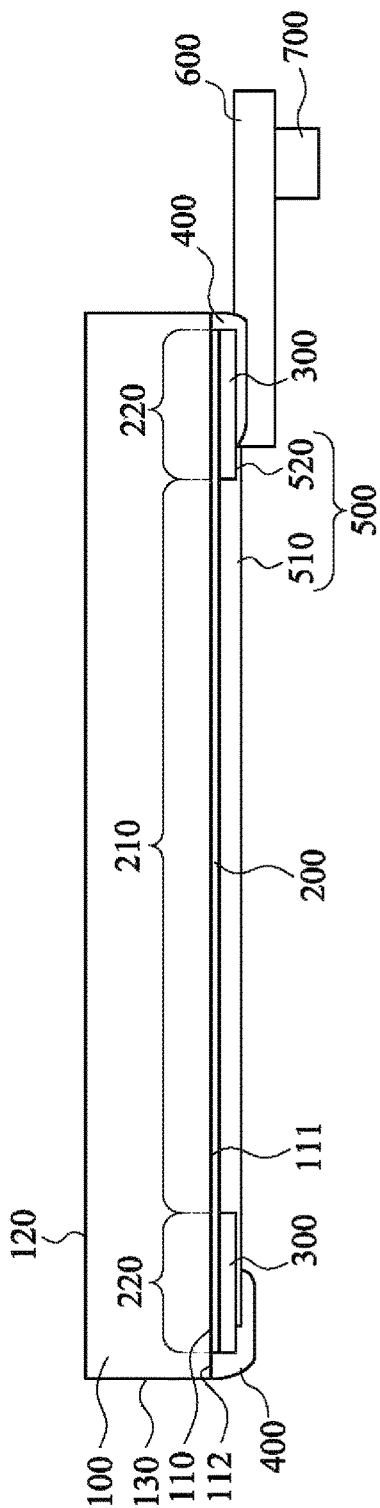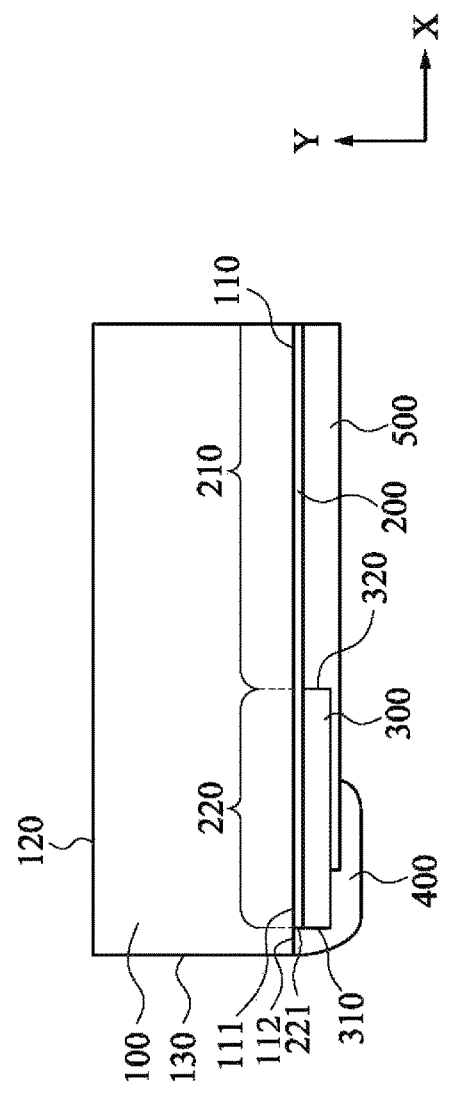

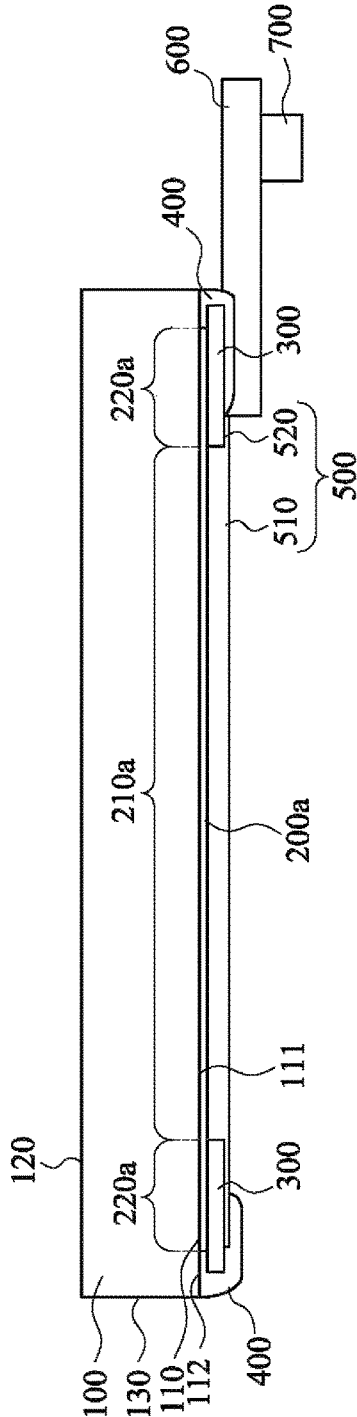
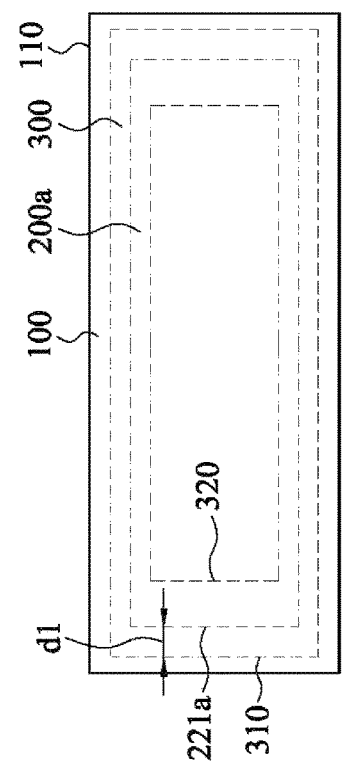
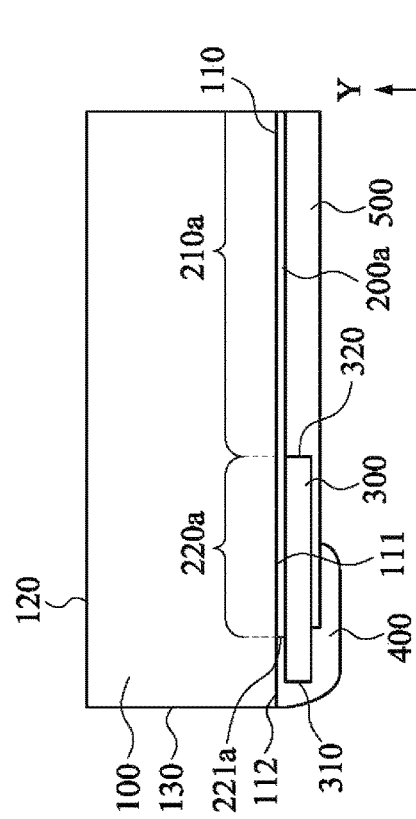
Fig. 4
Fig. 5
Fig. 6

TOUCH PANEL AND MANUFACTURE METHOD THEREOF

BACKGROUND OF THE DISCLOSURE

This Non-provisional application claims priority to Chinese Patent Application Serial Number No. 201510096756.5, filed in the People's Republic of China on Mar. 5, 2015, which is herein incorporated by reference.

FIELD OF THE DISCLOSURE

The present disclosure relates to a touch panel and a method for manufacturing the same.

DESCRIPTION OF THE RELATED ART

In pace with development of touch control technology, more and more electrical products, such as smart phones or tablets, employ touch panels to allow users to input commands by touching icons displayed on the screen.

In a one-glass touch panel, touch sensing electrodes are directly formed on the cover glass. After the material of the touch sensing electrodes is directly coated on the cover glass, this material and the cover glass undergo photolithography processes. With these photolithography processes, this material crystallizes on a surface of the cover glass, which however lowers the structural strength of the cover glass and reduces the impact resistance of the cover glass. In order to address this issue, some manufacturers coat light transmissive photoresist materials on the surface of the cover glass, so as to isolate the touch sensing electrodes from the cover glass.

Typically, a black mask (BM) layer is further formed on the surrounding area of the surface of the cover glass. When the BM material solution is coated on the light transmissive photoresist material, the surface tension of the coating induces irregular shrinkage of the edge of the BM material. Further, after the solvent is volatilized, solid-phase materials in the solution crystallize on the shrunken edge, which causes relatively bright patterns. Similarly, the surface tension also induces irregular shrinkage of the edge of the light transmissive photoresist material and thereby induces relatively bright patterns. Particularly, the relatively bright patterns caused by irregular shrinkage of the light transmissive photoresist material are even more perceptible due to the presence of the BM layer.

SUMMARY OF THE DISCLOSURE

The present disclosure provides a touch panel in which the undesirable appearance of the edge of the touch panel, such as color difference, may be alleviated.

In accordance with some embodiments of the present disclosure, a touch panel includes a cover plate, a light transmissive separating layer, an opaque layer and a touch sensing layer. The cover plate has an inner surface and a plate lateral surface adjoined to each other. The inner surface has a first portion and a second portion adjoined to each other. The light transmissive separating layer covers the first portion of the inner surface of the cover plate. The light transmissive separating layer has a peripheral zone and a central zone. The peripheral zone surrounds the central zone. The light transmissive separating layer has a light transmissive lateral surface distal to the central zone. The opaque layer covers the peripheral zone and has an opaque outer lateral surface substantially aligned with the light transmissive lateral surface. The light transmissive lateral surface and the opaque outer lateral surface shrink relative to the plate lateral surface and expose the second portion of the inner surface. The touch sensing layer is located on the central zone. The light transmissive separating layer separates the cover plate and the touch sensing layer.

In accordance with some embodiments of the present disclosure, a method of manufacturing a touch panel includes providing a cover plate having an inner surface and a plate lateral surface adjoined to each other, in which the inner surface has a first portion and a second portion adjoined to each other. A light transmissive separating layer is formed to cover the first portion. The light transmissive separating layer has a peripheral zone and a central zone. The peripheral zone surrounds the central zone. The light transmissive separating layer has a light transmissive lateral surface distal to the central zone. An opaque layer is formed to cover the peripheral zone of the light transmissive separating layer. The opaque layer having an opaque outer lateral surface substantially aligned with the light transmissive lateral surface. The light transmissive lateral surface and the opaque outer lateral surface shrink relative to the plate lateral surface and expose the second portion of the inner surface. A touch sensing layer is formed on the central zone. The light transmissive separating layer separates the cover plate and the touch sensing layer.

In the foregoing embodiments, since the light transmissive lateral surface and the opaque outer lateral surface are substantially aligned and shrink relative to the plate lateral surface, the color difference induced by irregular shrinkage of the light transmissive separating layer and the opaque layer can be alleviated, so that the undesirable appearance issue, such as the color difference, can be solved.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 1 is a schematic view of a touch panel in accordance with some embodiments of the present disclosure;

FIG. 2 is an enlarged fragmentary view of FIG. 1;

FIG. 4 is a schematic view of a touch panel in accordance with other embodiments of the present disclosure;

FIG. 5 is an enlarged fragmentary view of the touch panel in FIG. 4;

FIG. 6 is a top view of the touch panel in FIG. 5;

DETAILED DESCRIPTION OF THE DISCLOSURE

Figure 3:
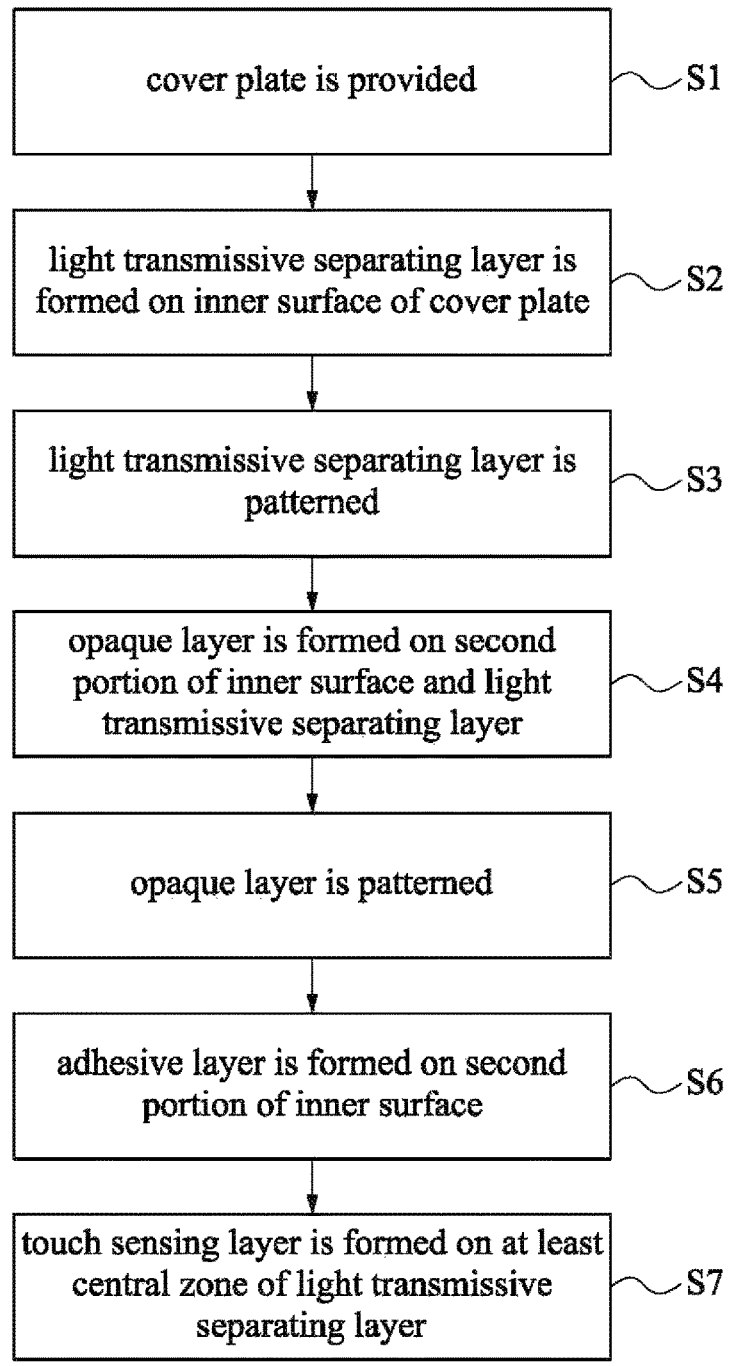
FIG. 3 is a flow chart of the method of manufacturing the touch panel in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a schematic view of a touch panel in accordance with some embodiments of the present disclosure. As shown in FIG. 1, the touch panel includes a cover plate 100, a light transmissive separating layer 200, an opaque layer 300 and a touch sensing layer 500.

The cover plate 100 has an inner surface 110, an outer surface 120 and a plate lateral surface 130. The outer surface 120 may serve as a user's touch control interface. Moreover, one or more functional layers, such as an anti-stain layer, an anti-fingerprint layer, an anti-abrasion layer or an anti-glare layer, may be optionally disposed on the outer surface 120. The inner surface 110 and the outer surface 120 are opposite. The plate lateral surface 130 adjoins the inner surface 110 and the outer surface 120. More particularly, the plate lateral surface 130 perpendicularly adjoins between the inner surface 110 and the outer surface 120. The inner surface 110 has a first portion 111 and a second portion 112 adjoined to each other. In some embodiments, the second portion 112 is a peripheral zone of the inner surface 110 close to the plate lateral surface 130, and the first portion 111 is a central zone of the inner surface 110. The second portion 112 surrounds the first portion 111. The outer surface 120, the inner surface 110 and the plate lateral surface 130 are chemically strengthened or physically strengthened, so as to improve the ability to protect the light transmissive separating layer 200, the opaque layer 300 and the touch sensing layer 500 under the cover plate 100.

The light transmissive separating layer 200 covers the first portion 111 of the inner surface 110 of the cover plate 100 and does not cover the second portion 112. The light transmissive separating layer 200 has a central zone 210 and a peripheral zone 220. The peripheral zone 220 surrounds the central zone 210. The opaque layer 300 covers the peripheral zone 220, and the touch sensing layer 500 at least covers the central zone 210. An orthographic projection area of the light transmissive separating layer 200 on the cover plate 100 is greater than an orthographic projection area of the touch sensing layer 500 on the cover plate 100. In other words, the touch sensing layer 500 is located on the central zone 210, so that the central zone 210 of the light transmissive separating layer 200 can separate the cover plate 100 and the touch sensing layer 500. It is understood that the central zone 210 refers to the zone on the light transmissive separating layer 200 that is in contact with the touch sensing layer 500, and the peripheral zone 220 is the zone on the light transmissive separating layer 200 that is in contact with the opaque layer 300.

When the light transmissive separating layer 200 and the opaque layer 300 cover the second portion 112 of the inner surface 110, the user may perceive the color difference, such as relatively bright patterns, caused by the light transmissive separating layer 200 and the opaque layer 300 on the second portion 112. It is observed that after coating the light transmissive separating layer 200 and the opaque layer 300, the light transmissive separating layer 200 and the opaque layer 300 on the second portion 112 irregularly shrink. Such irregular shrinkage makes the color difference become more perceptible. Therefore, embodiments of the present disclosure provide following technical solutions to address this issue.

Reference can be made to FIG. 2, which is an enlarged fragmentary view of FIG. 1. In various embodiments of the present disclosure, the light transmissive separating layer 200 has a light transmissive lateral surface 221 distal to the central zone 210. More particularly, the light transmissive lateral surface 221 is the portion of the peripheral zone 220 farthest away from the central zone 210. The opaque layer 300 has an opaque outer lateral surface 310. The light transmissive lateral surface 221 and the opaque outer lateral surface 310 are substantially aligned with each other, so that the boundary thereof is not perceptible by the naked eye. The light transmissive lateral surface 221 and the opaque outer lateral surface 310 are closer to the central zone 210 than the plate lateral surface 130 is, so that the light transmissive lateral surface 221 and the opaque outer lateral surface 310 shrink relative to the plate lateral surface 130 and expose the second portion 112 of the inner surface 110. In particular, the light transmissive lateral surface 221 of the light transmissive separating layer 200 and the opaque outer lateral surface 310 of the opaque layer 300 are regularly patterned to be regular patterns, thereby exposing the second portion 112 of the inner surface 110.

The light transmissive lateral surface 221 and the opaque outer lateral surface 310 not only shrink relative to the plate lateral surface 130, but the light transmissive lateral surface 221 and the opaque outer lateral surface 310 are also substantially aligned with each other. Therefore, the light transmissive lateral surface 221 and the opaque outer lateral surface 310 regularly shrink, instead of irregularly shrinking. As such, when the user watches the touch panel from the location above the outer surface 120, the color difference on the edge of the touch panel is not easily perceptible, so that the color difference issue caused by the relatively bright patterns induced by irregular shrinkage of the light transmissive separating layer 200 and the opaque layer 300 can be solved.

It is understood that, in this context, "regularly patterned" and "substantially aligned" relating to the light transmissive lateral surface 221 and the opaque outer lateral surface 310 not only refer to the embodiments in which the light transmissive lateral surface 221 and the opaque outer lateral surface 310 are completely aligned, but also refer to the embodiments in which the light transmissive lateral surface 221 and the opaque outer lateral surface 310 keep an extremely short interval, or embodiments in which the light transmissive lateral surface 221 and the opaque outer lateral surface 310 are formed as regularly graded patterns, as long as the boundary of the light transmissive lateral surface 221 and the opaque outer lateral surface 310 is not perceptible by the naked eye.

As shown in FIG. 2, in various embodiments, the opaque layer 300 has an opaque inner lateral surface 320. The opaque outer lateral surface 310 is opposite to the opaque inner lateral surface 320. The opaque outer lateral surface 310 is farther than the central zone 210 than the opaque inner lateral surface 320 is. More particularly, the opaque outer lateral surface 310 is the portion of the opaque layer 300 that is farthest away from the central zone 210, and the opaque inner lateral surface 320 is the portion of the opaque layer 300 that is closest to the central zone 210. As shown in FIG. 2, in some embodiments, the light transmissive lateral surface 221 and the opaque outer lateral surface 310 are completely aligned with each other. In other words, a projection of the light transmissive lateral surface 221 on the inner surface 110 and a projection of the opaque outer lateral surface 310 on the inner surface 110 have the same shape and the same size. In other words, no portion of the light transmissive lateral surface 221 extends outside or shrinks inside the opaque outer lateral surface 310. By such a configuration, when the user views the touch panel from the location above the outer surface 120 above the cover plate 100, the color difference is not easily perceptible.

In various embodiments, as shown in FIG. 2, a distance from the light transmissive lateral surface 221 to the plate lateral surface 130 along X direction is equal to a distance from the opaque outer lateral surface 310 to the plate lateral surface 130 along X direction, so that the light transmissive lateral surface 221 and the opaque outer lateral surface 310 can be completely aligned with each other and be shrunken relative to the plate lateral surface 130.

In various embodiments, the light transmissive separating layer 200 is a coating layer made of a material that is light transmissive and heat-resist. For example, the material of the light transmissive separating layer 200 includes a transparent macromolecular elastic material, which includes plastic polymer and elastomer, such as polyimide, PMMA, polycarbonate (PC), polyethylene terephthalate (PET) or light transmissive photoresist. The peripheral zone 220 of the light transmissive separating layer 200 can be regularly patterned to be regular patterns by using techniques such as photolithography, so that the light transmissive lateral surface 221 can be substantially aligned with the opaque outer lateral surface 310.

More particularly, the light transmissive separating layer 200 can be formed on the entire inner surface 110 of the cover plate 100 by a coating process at first, and then, the patterns of the peripheral zone 220 can be defined by design of the photo-mask, and then, the light transmissive separating layer 200 on the second portion 112 can be removed. For example, the shape and size of the light transmissive lateral surface 221 can be defined by design of the photo-mask, so as to make the light transmissive lateral surface 221 and the opaque outer lateral surface 310 substantially aligned with each other, as shown in FIG. 2. It is understood that the foregoing photolithography process is only one example to make the light transmissive lateral surface 221 and the opaque outer lateral surface 310 substantially aligned with each other, not limiting this disclosure.

In various embodiments, the material of the opaque layer 300 includes an opaque photoresist. The opaque photoresist may be a deep colored photoresist, such as a black photoresist or a brown photoresist. The opaque layer 300 may be regularly patterned to be regular patterns by photolithography. More particularly, the patterns of the opaque layer 300 can be defined by design of a photo-mask. For example, the shape and size of the opaque outer lateral surface 310 can be defined by design of the photo-mask, so as to make the light transmissive lateral surface 221 and the opaque outer lateral surface 310 substantially aligned with each other, as shown in FIG. 2. It is understood that the foregoing photolithography process is only one example to make the light transmissive lateral surface 221 and the opaque outer lateral surface 310 substantially aligned with each other, not limiting this disclosure.

The light transmissive lateral surface 221 of the light transmissive separating layer 200 and the opaque outer lateral surface 310 of the opaque layer 300 are regularly patterned to be regular patterns. In various embodiments, the method of manufacturing the touch panel is illustrated in FIG. 3.

In step S1, the cover plate 100 can be provided. Then, in step S2, the light transmissive separating layer 200 is formed on the entire inner surface 110 of the cover plate 100. For example, the solution of the material of the light transmissive separating layer 200 can be coated on the inner surface 110. Then, in step S3, the light transmissive separating layer 200 can be patterned by photolithography, so as to make the light transmissive lateral surface 221 patterned regularly and expose the second portion 112. Then, in step S4, the opaque layer 300 can be formed on the entire second portion 112 and the entire light transmissive separating layer 300. For example, the solution of the material of the opaque layer 300 can be coated on the light transmissive separating layer 200 and the second portion 112. Then, in step S5, the opaque layer 300 can be patterned by photolithography, so as to make the opaque outer lateral surface 310 of the opaque layer 300 regularly patterned and expose the second portion 112. The light transmissive lateral surface 221 of the light transmissive separating layer 200 and the opaque outer lateral surface 310 of the opaque layer 300 are substantially aligned with each other. Therefore, even if the edge of the light transmissive separating layer 200 may irregularly shrink when it is formed on the second portion 112, and the edge of the opaque layer 300 may irregularly shrink when it is formed on the light transmissive separating layer 200, the shape defect of the light transmissive separating layer 200 is not perceptible when the user views the touch panel from the location above the outer surface 120 because of the following reasons. One reason is that after forming the light transmissive separating layer 200 and the opaque layer 300, they are further regularly patterned to be regular patterns, so as to remove the relatively bright patterns caused by irregular shrinkage. Another reason is that the light transmissive lateral surface 221 of the light transmissive separating layer 200 and the opaque outer lateral surface 310 of the opaque layer 300 are substantially aligned with each other. Another reason is that the cover plate 100 has a thickness much greater than the thickness of the light transmissive separating layer and the opaque layer, and the edge of the cover plate 100 generates a uniform shade. Therefore, the width of the second portion 112 can be reasonably determined to make the shade further cover the boundary of the light transmissive lateral surface 221 and the opaque outer lateral surface 310 to further improve the appearance of the touch panel. The width of the second portion 112 is the interval defined by the projection of the light transmissive lateral surface 221 or the opaque outer lateral surface 310 on the inner surface 110 and the projection of the plate lateral surface 130 on the inner surface 110. Preferably, the interval ranges from 150 µm to 350 µm.

The foregoing method is only one example to pattern the light transmissive separating layer 200 and the opaque layer 300. Alternatively, the patterning process may be implemented by printing, laser etching, transfer printing and so on.

In various embodiments, because the light transmissive separating layer 200 and the opaque layer 300 both shrink relative to the plate lateral surface 130 to expose the second portion 112, an adhesive layer 400 is formed on the second portion 112 of the inner surface 110 of the cover plate 100 in the step S6, so as to prevent light leakage on the second portion 112. Finally, in step S7, the touch sensing layer 500 is formed on at least the central zone 210 of the light transmissive separating layer 200 to form the touch panel.

Therefore, in various embodiments, as shown in FIG. 2, the touch panel further includes the adhesive layer 400. The adhesive layer 400 at least covers the second portion 112 of the inner surface 110. The adhesive layer 400 and the opaque layer 300 have analogous colors and different properties. A viscosity of the adhesive layer 400 is greater than a viscosity of the opaque layer 300 to prevent irregular shrinkage. The material of the opaque layer 300 may be determined based on uniformity and smoothness of the coated opaque layer 300 to improve the reliability of wires on a wiring zone 520 of the touch sensing layer 500, and therefore, the viscosity of the material of the opaque layer 300 is relatively low, and the solution of this material contains smaller particles. More particularly, the adhesive layer 400 and the opaque layer 300 have the same color. For example, the color of the adhesive layer 400 and the opaque layer 300 can be deep color, such as black or brown. In various embodiments, the viscosity of the adhesive layer 400 is higher than the viscosity of the opaque layer 300, so that compared to the opaque layer 300, irregular shrinkage is relatively hard to occur on the adhesive layer 400. As such, the adhesive layer 400 can contact the boundary of the second portion 112 of the inner surface 110 and the plate lateral surface 130, so as to completely cover the second portion 112 of the inner surface 110, thereby preventing light from traveling through the second portion 112 of the inner surface 110. Preferably, the viscosity of the material of the adhesive layer 400 is greater than 1000 CPS, and the viscosity of the material of the opaque layer 300 ranges from 4 CPS to 30 CPS. For example, the material of the opaque layer 300 may include an opaque photoresist, and the material of the adhesive layer 400 may include, but is not limited to including, an ink or an insulation glue, such as black ink or brown ink. The ink can be cured after it is coated.

In various embodiments, a portion of the opaque layer 300, a portion of the touch sensing layer 500 and a portion of the peripheral zone 220 of the light transmissive separating layer 200 are sandwiched between the adhesive layer 400 and the cover plate 100. In other words, the adhesive layer 400 covers the portion of the touch sensing layer 500, the portion of the opaque layer 300 and the portion of peripheral zone 220 on the inner surface 110 of the cover plate 100.

In various embodiments, as shown in FIG. 1, the touch panel may further include a flexible circuit board 600 and a control circuit 700. The control circuit 700 is electrically connected to and disposed on the flexible circuit board 600. The flexible circuit board 600 is electrically connected to the touch sensing layer 500, so as to transmit the touch signal detected by the touch sensing layer 500 to the control circuit 700. More particularly, the touch sensing layer 500 includes an electrode zone 510 and a wiring zone 520. The wiring zone 520 surrounds the electrode zone 510 or is located on at least one side of the electrode zone 510. The electrode zone 510 is disposed on the central zone 210 of the light transmissive separating layer 200 and includes a plurality of transparent conductive patterns therein. The material of the transparent conductive pattern may be, but is not limited to being, indium tin oxide (ITO) or indium zinc oxide (IZO). The wiring zone 520 is disposed on the opaque layer 300, so that the wiring zone 520 can be shaded by the opaque layer 300 when the user views the touch panel from the location above the outer surface 120. Therefore, the wiring zone 520 does not require light transmissive elements, so in various embodiments, the wiring zone 520 may include a plurality of metal wires therein. The material of the metal wires may be, but is not limited to being, copper or argentums. The transparent conductive patterns in the electrode zone 510 are electrically connected to the metal wires in the wiring zone 520, and the metal wires in the wiring zone 520 are electrically connected to the flexible circuit board 600. Therefore, when the transparent conductive patterns in the electrode zone 510 detect a touch signal, the touch signal can be transmitted to the flexible circuit board 600 via the metal wires in the wiring zone 520 and can be transmitted to the control circuit 700 via the flexible circuit board 600.

FIG. 4 is a schematic view of a touch panel in accordance with other embodiments of the present disclosure. FIG. 5 is an enlarged fragmentary view of the touch panel in FIG. 4. As shown in FIGS. 4 and 5, the main difference between this embodiment and foregoing embodiments is that the light transmissive separating layer 200a and the opaque layer 300 have different sizes. In particular, the light transmissive separating layer 200a includes a central zone 210a and a peripheral zone 220a surrounding zone 210a. The peripheral zone 220a includes a light transmissive lateral surface 221a distal to the central zone 210a. The light transmissive lateral surface 221a shrinks relative to the opaque outer lateral surface 310. In other words, the light transmissive lateral surface 221a is closer to the central zone 210a than the opaque outer lateral surface 310 is. In other words, the distance from the light transmissive lateral surface 221a to the central zone 210a along X direction is shorter than the distance from the opaque outer lateral surface 310 to the central zone 210a along X direction. It is understood that the interval that the light transmissive lateral surface 221a shrinks relative to the opaque outer surface 310 is short enough that the naked eye ignores the color difference.

In particular, as shown in FIG. 6, which is a top view of the touch panel in FIG. 5. From the top view, the projection of the light transmissive lateral surface 221a on the inner surface 110 and the projection of the opaque outer lateral surface 310 on the inner surface 110 have the same shape and different sizes. More particularly, the projection of the opaque outer lateral surface 310 on the inner surface 110 surrounds the projection of the light transmissive lateral surface 221a on the inner surface 110. The projection of the light transmissive lateral surface 221a on the inner surface 110 and the projection of the opaque outer lateral surface 310 on the inner surface 110 define an interval d1, and the interval d1 is less than or equal to 0.01 mm, which is short enough to make the naked eye ignore the color difference. Because the projection shape of the light transmissive lateral surface 221a on the inner surface 110 and the projection shape of the opaque outer lateral surface 310 on the inner surface 110 are the same, the interval between each location of the light transmissive lateral surface 221a and a corresponding location of the opaque outer lateral surface 310 is constant, and therefore, the entire light transmissive lateral surface 221a uniformly shrinks at an imperceptible interval. As such, although in this embodiment, the light transmissive lateral surface 221a is not completely aligned with the opaque outer lateral surface 310, the color difference is still not perceptible when the user views the touch panel.

Other elements shown in FIGS. 4-6 are the same as which are shown in FIGS. 1 and 2, and therefore, they are not described repeatedly.

Figure 7:
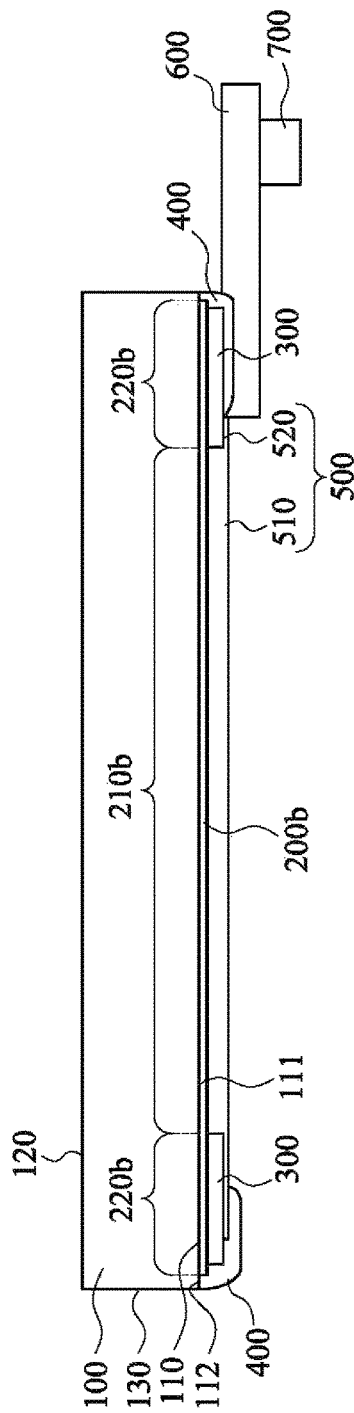
FIG. 7 is a schematic view of a touch panel in accordance with other embodiments of the present disclosure.
Figure 8:
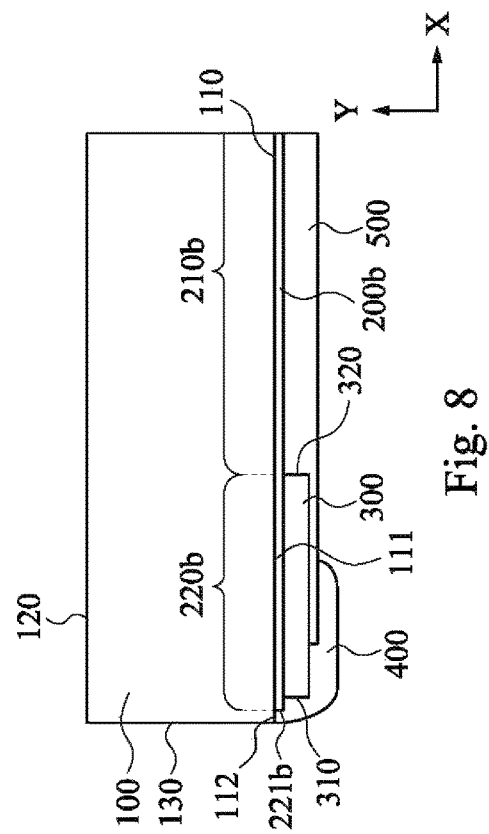
FIG. 8 is an enlarged fragmentary view of the touch panel in FIG. 7.

FIG. 7 is a schematic view of a touch panel in accordance with other embodiments of the present disclosure. FIG. 8 is an enlarged fragmentary view of the touch panel in FIG. 7. As shown in FIGS. 7 and 8, the main difference between this embodiment and foregoing embodiments is that the light transmissive separating layer 200b and the opaque layer 300 have different sizes. In particular, the light transmissive separating layer 200b includes a central zone 210b and a peripheral zone 220b surrounding zone 210b. The peripheral zone 220b includes a light transmissive lateral surface 221b distal to the central zone 210b. The light transmissive lateral surface 221b extends or protrudes outwardly relative to the opaque outer lateral surface 310. In other words, the light transmissive lateral surface 221b is farther from the central zone 210b than the opaque outer lateral surface 310 is. In other words, the distance from the light transmissive lateral surface 221b to the central zone 210b along X direction is longer than the distance from the opaque outer lateral surface 310 to the central zone 210b along X direction. It is understood that the interval that the light transmissive lateral surface 221b extends or protrudes relative to the opaque outer surface 310 is short enough to make the naked eye ignore the color difference.

Figure 9:
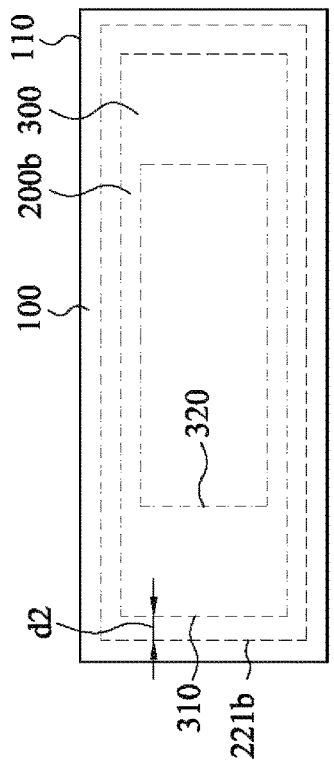
FIG. 9 is a top view of the touch panel in FIG. 8.

In particular, as shown in FIG. 9, which is a top view of the touch panel in FIG. 8, from the top view, the projection of the light transmissive lateral surface 221b on the inner surface 110 and the projection of the opaque outer lateral surface 310 on the inner surface 110 have the same shape and different sizes. More particularly, the projection of the light transmissive lateral surface 221b on the inner surface 110 surrounds the projection of the opaque outer lateral surface 310 on the inner surface 110. The projection of the light transmissive lateral surface 221b on the inner surface 110 and the projection of the opaque outer lateral surface 310 on the inner surface 110 define an interval d2, and the interval d2 is less than or equal to 0.01 mm, which is short enough to make the naked eye ignore the color difference. Because the interval between each location of the light transmissive lateral surface 221b and a corresponding location of the opaque outer lateral surface 310 is constant, the entire light transmissive lateral surface 221b uniformly extends or protrudes at an imperceptible interval. As such, although in this embodiment, the light transmissive lateral surface 221b is not completely aligned with the opaque outer lateral surface 310, the color difference is still not perceptible when the user views the touch panel.

Other elements shown in FIGS. 7-9 are the same as which are shown in FIGS. 1 and 2, and therefore, they are not described repeatedly.

Figure 10:
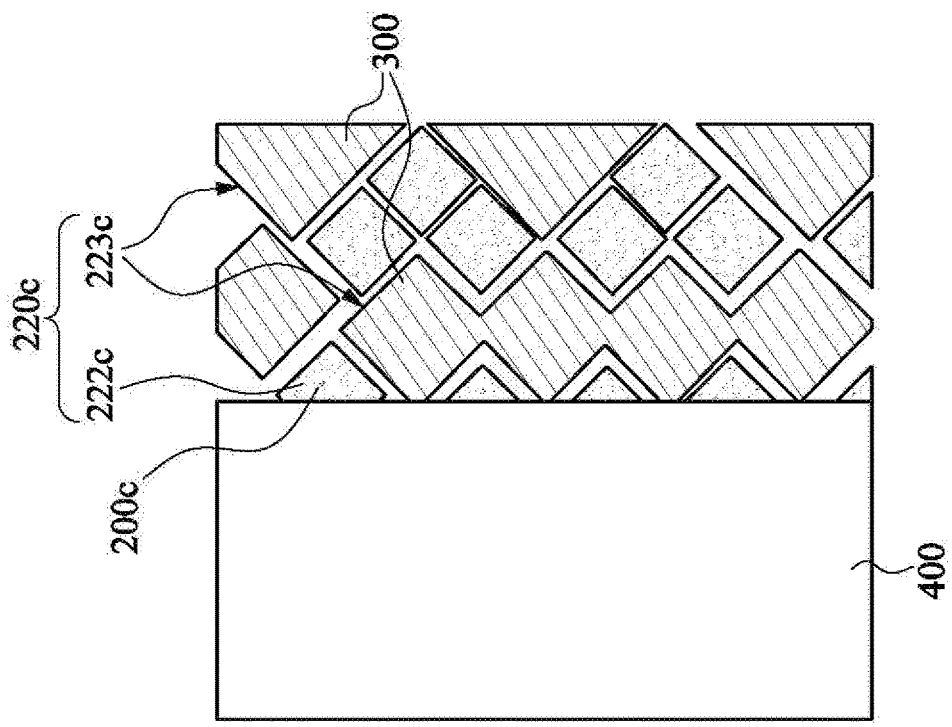
FIG. 10 is a schematic view of a touch panel in accordance with other embodiments of the present disclosure.

FIG. 10 is a schematic view of a touch panel in accordance with another embodiment of the present disclosure. As shown in FIG. 10, the main difference between this embodiment and foregoing embodiments is that the peripheral zone 220c of the light transmissive separating layer 200c is patterned to form alternating graded patterns with the opaque layer 300. More particularly, the peripheral zone 220c of the light transmissive separating layer has a plurality of light transmissive structures 222c and a plurality of hollow zones 223c. The light transmissive structures 222c and the hollow zones 223c are arranged in an alternating manner. The opaque layer 300 covers the hollow zones 223c. More particularly, the light transmissive structure 222c has, for example, a light transmissive photoresist, and the hollow zone 223c does not have light transmissive photoresist and exposes the opaque layer 300. Therefore, when the user views the touch panel from the top view, the light transmissive structures 222c and the hollow zones 223c are arranged in an alternating manner and are therefore not perceptible. In various embodiments, the material of the light transmissive structure 222c is, but is not limited to, a light transmissive photoresist.

In various embodiments, as shown in FIG. 10, the area of the hollow zones 223c gradually varies along a particular direction. For example, the area of the hollow zones 223c may increase along a direction toward the central zone (shown in FIG. 8), so as to make the user further ignore the color difference. It is understood that these graded patterns are only exemplary, not limiting the present disclosure. Any other graded pattern, which makes the user ignore the color difference, can be encompassed in the present disclosure. It is understood that the light transmissive lateral surface and the opaque outer lateral surface are not shown in FIG. 10 for clarity, but in some embodiments, no matter what graded patterns are formed by the peripheral zone 220c and the opaque layer 300, the light transmissive lateral surface of the peripheral zone 220c and the opaque outer lateral surface of the opaque layer 300 are still substantially aligned with each other.

Figure 11:
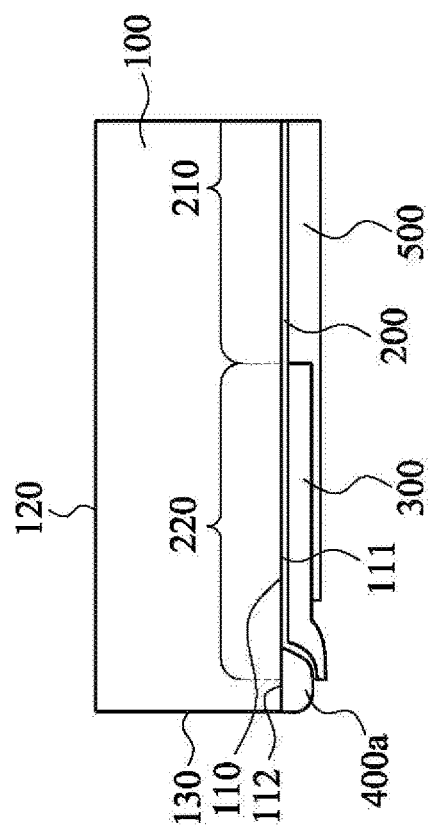
FIG. 11 is a schematic view of a touch panel in accordance with other embodiments of the present disclosure.

FIG. 11 is a schematic view of a touch panel in accordance with other embodiments of the present disclosure. As shown in FIG. 11, the main difference between this embodiment and foregoing embodiments is that a location of the adhesive layer 400a is different from the foregoing adhesive layer 400. More particularly, at least a portion of the adhesive layer 400a is sandwiched between at least a portion of the peripheral zone 220 of the light transmissive separating layer 200 and the cover plate 100, and this portion of the peripheral zone 220 is sandwiched between this portion of the adhesive layer 400a and at least portion of the opaque layer 300. In other words, the peripheral zone 220 of the light transmissive separating layer 200 covers the adhesive layer 400a on the inner surface 110 of the cover plate 100, and the opaque layer 300 is covered on the peripheral zone 220. The adhesive layer 400a at least covers the second portion 112 of the inner surface 110 that are not covered by the light transmissive separating layer 200 and the opaque layer 300. The adhesive layer 400a contacts a boundary of the second portion 112 of the inner surface 110 and the plate lateral surface 130, so as to completely cover the second portion 112 of the inner surface 110.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A touch panel, comprising:
   a cover plate having an inner surface and a plate lateral surface adjoined to each other, the inner surface having a first portion and a second portion adjoined to each other, wherein the second portion surrounds the first portion;
   a light transmissive separating layer covering the first portion and having a peripheral zone and a central zone, the peripheral zone surrounding the central zone, the light transmissive separating layer having a light transmissive lateral surface distal to the central zone;
   an opaque layer covering the peripheral zone of the light transmissive separating layer and having an opaque outer lateral surface substantially aligned with the light transmissive lateral surface, the light transmissive lateral surface and the opaque outer lateral surface shrinking relative to the plate lateral surface and exposing the second portion of the inner surface; and
   a touch sensing layer located on the central zone, the light transmissive separating layer separating the cover plate and the touch sensing layer.
2. The touch panel of claim 1, further comprising an adhesive layer at least covering the second portion of the inner surface, wherein the adhesive layer and the opaque layer have analogous colors, and wherein a viscosity of the adhesive layer is greater than a viscosity of the opaque layer.

3. The touch panel of claim 1, wherein the light transmissive lateral surface of the light transmissive separating layer and the opaque outer lateral surface of the opaque layer are regularly patterned.

4. The touch panel of claim 1, wherein the light transmissive lateral surface and the opaque outer lateral surface are completely aligned with each other.

5. The touch panel of claim 1, wherein a distance between an orthographic projection area of the light transmissive lateral surface on the inner surface and an orthographic projection area of the opaque outer lateral surface on the inner surface defines an interval that ranges from 150 µm to 350 µm.

6. The touch panel of claim 1, wherein an orthographic projection area of the light transmissive lateral surface on the inner surface and an orthographic projection area of the opaque outer lateral surface on the inner surface have the same shape and different sizes.

7. The touch panel of claim 6, wherein the orthographic projection area of the light transmissive lateral surface on the inner surface surrounds the orthographic projection area of the opaque outer lateral surface on the inner surface.

8. The touch panel of claim 7, wherein a distance between the orthographic projection area of the light transmissive lateral surface on the inner surface and the orthographic projection area of the opaque outer lateral surface on the inner surface defines an interval, and the interval is less than or equal to 0.01 mm.

9. The touch panel of claim 6, wherein the orthographic projection area of the opaque outer lateral surface on the inner surface surrounds the orthographic projection area of the light transmissive lateral surface on the inner surface.

10. The touch panel of claim 9, wherein a distance between the orthographic projection area of the light transmissive lateral surface on the inner surface and the orthographic projection area of the opaque outer lateral surface on the inner surface defines an interval that is less than or equal to 0.01 mm.

11. The touch panel of claim 1, wherein the peripheral zone of the light transmissive separating layer has a plurality of light transmissive structures and a plurality of hollow zones, wherein the light transmissive structures and the hollow zones are arranged in an alternating manner, and wherein the opaque layer at least covers the hollow zones.

12. The touch panel of claim 1, wherein a material of the light transmissive separating layer comprises a transparent macromolecular elastic material.

13. The touch panel of claim 1, wherein at least portion of the opaque layer and at least portion of the light transmissive separating layer are sandwiched between the adhesive layer and the cover plate.

14. The touch panel of claim 1, wherein at least portion of the adhesive layer is sandwiched between at least portion of the light transmissive separating layer and the cover plate, and the portion of the light transmissive separating layer is sandwiched between the portion of the adhesive layer and at least portion of the opaque layer.

15. The touch panel of claim 1, wherein a viscosity of a material of the adhesive layer is greater than or equal to 1000 CPS.

16. The touch panel of claim 15, wherein the material of the adhesive layer comprises an ink or an insulating glue.

17. The touch panel of claim 1, wherein the cover plate further comprises an outer surface opposite to the inner surface, and wherein the outer surface, the inner surface and the plate lateral surface are chemical strengthened.

18. A method of manufacturing a touch panel, comprising:
providing a cover plate having an inner surface and a plate lateral surface adjoined to each other, the inner surface having a first portion and a second portion adjoined to each other, wherein the second portion surrounds the first portion;
forming a light transmissive separating layer to cover the first portion, the light transmissive separating layer having a peripheral zone and a central zone, the peripheral zone surrounding the central zone, the light transmissive separating layer having a light transmissive lateral surface distal to the central zone;
forming an opaque layer to cover the peripheral zone of the light transmissive separating layer, the opaque layer having an opaque outer lateral surface substantially aligned with the light transmissive lateral surface, the light transmissive lateral surface and the opaque outer lateral surface shrinking relative to the plate lateral surface and exposing the second portion of the inner surface; and
forming a touch sensing layer on the central zone, the light transmissive separating layer separating the cover plate and the touch sensing layer.

19. The method of claim 18, further comprising forming an adhesive layer to at least cover the second portion of the inner surface, wherein the adhesive layer and the opaque layer have analogous colors, and wherein a viscosity of the adhesive layer is greater than a viscosity of the opaque layer.

20. The method of claim 18, wherein forming the light transmissive separating layer and the opaque layer comprises:
forming the light transmissive separating layer on the entire inner surface of the cover plate;
patterning the light transmissive separating layer to make the light transmissive lateral surface of the light transmissive separating layer regularly patterned and expose the second portion;
forming the opaque layer on the entire second portion and the entire light transmissive separating layer; and
patterning the opaque layer to make the opaque outer lateral surface of the opaque layer regularly patterned and expose the second portion.

\* \* \* \* \*